Oct. 11, 1966          E. C. EMRICK                3,277,931
                      MEASURING DEVICE
Filed July 22, 1963                        2 Sheets-Sheet 1
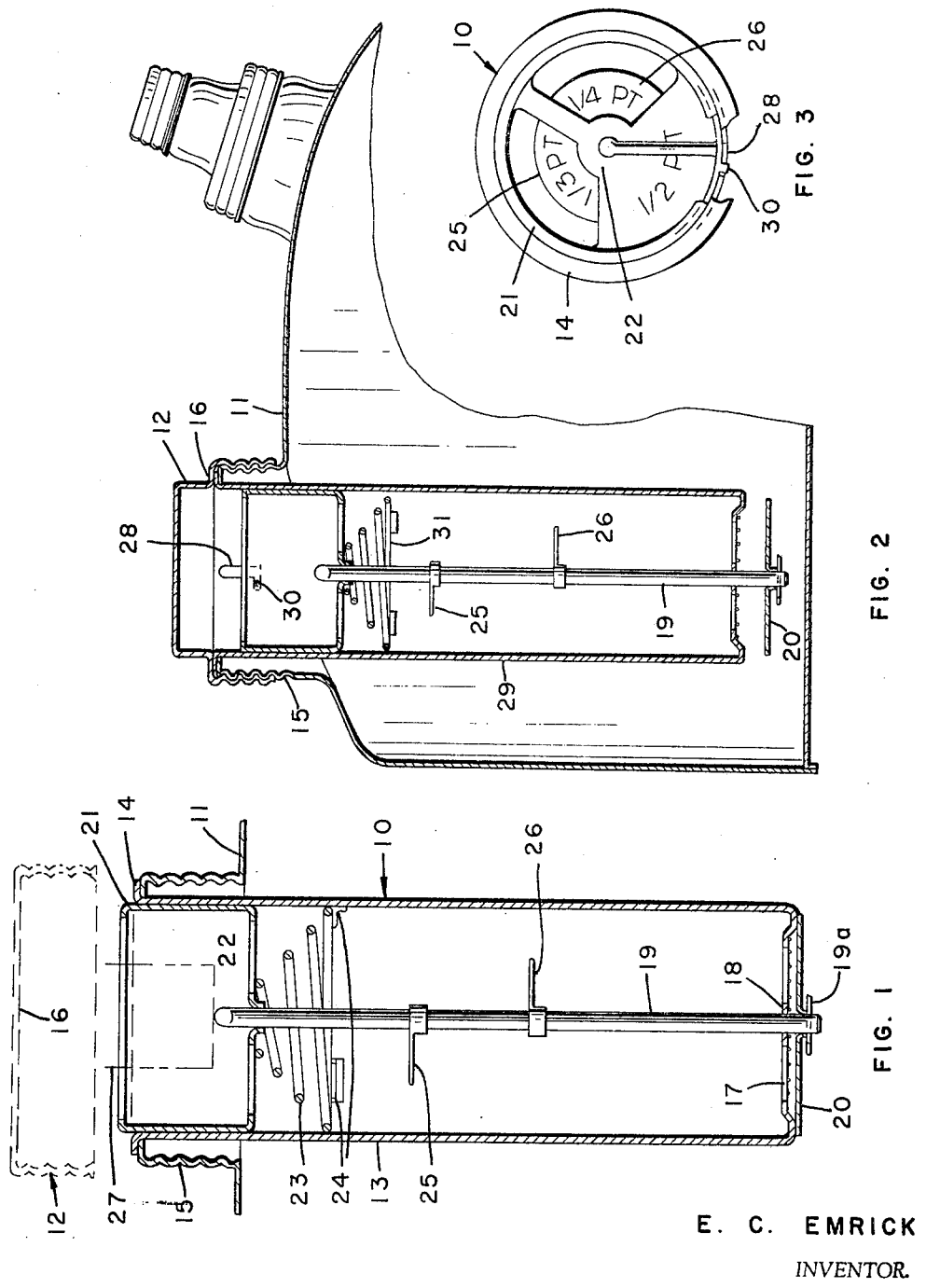
E. C. EMRICK
INVENTOR.

Oct. 11, 1966  E. C. EMRICK  3,277,931
MEASURING DEVICE
Filed July 22, 1963  2 Sheets-Sheet 2

INVENTOR:
E. C. EMRICK
BY

United States Patent Office 3,277,931
Patented Oct. 11, 1966

3,277,931
MEASURING DEVICE
E. C. Emrick, Grand Rapids, Mich., assignor to
Lily Emrick and said E. C. Emrick, jointly
Filed July 22, 1963, Ser. No. 296,613
7 Claims. (Cl. 141—364)

This invention provides a measuring device developed primarily to measure the quantity of lubricating oil added to gasoline for use in conjunction with two-cycle engines. Outboard motors, chain saws, and a tremendous variety of self-powered devices utilize small 2-cycle engines, and the problem of properly mixing the lubricating oil with the gasoline must be attended to with care in order to avoid misuse of the engines. A variety of devices and expedients have been developed for simplifying this rather messy procedure, but none of these has been fully satisfactory. Transparent bottles with pouring indicia have come into a rather wide use, and with these the amount of lubricating oil is read as it is poured. Such a procedure prevents the possibility of using the small fully-sealed metal containers that minimize the storage problem. It is also obvious that any separate measuring device will have a tendency to collect droplets of oil on its exterior, and will tend to accumulate an oily film on its surface that will attract dirt and foreign particles which must be kept out of the engine system.

The present invention provides a measuring device which is preferably retained permanently within the gasoline can, and does not become an extra piece of equipment that must be handled separately during the measuring procedure. In the use of this invention, the cap of a standard gasoline can is removed; and if the measuring device is first being installed, it is merely slipped into the opening. The device is then in position to receive the desired quantity of lubricating oil, the filling taking place either to the top, or to the desired fractional levels indicated by interior indicia on the device. Restoration of the cap to its original position on the container will serve the function of actuating a valve which dumps the lubricant into the interior of a container, the valve remaining open so that the gasoline is free to circulate within the device without entrapment. This procedure is used primarily when the gasoline can is provided with two openings, the gasoline being inserted in the opposite opening from that in which the measuring device is installed. As an alternative procedure, the gasoline may be inserted at the same opening occupied by the measuring device, accompanied by the downward pressure of the fuel supply nozzle on the device. This has the effect of opening the control valve of the measuring device and discharging the contents into the can at the same time that the fuel is added. The flow of the gasoline through the open device has the desirable advantage of thoroughly washing the interior so that the lubricating oil is completely intermixed with the gasoline, without clinging to the sides of the measuring unit. In other modifications of the device, the unit may be manually set to either "open" or "closed" positions, depending upon whether the lubricating oil is being measured or dumped into the interior of the can.

The several features of the invention will be analyzed in detail through a discussion of the particular embodiments illustrated in the accompanying drawings. In the drawings:

FIGURE 1 is a sectional elevation of one modification of the invention, showing the device in the condition preparatory to receiving and measuring a quantity of lubricating oil.

FIGURE 2 illustrates a modified form of the invention, with the device locked in the discharge position in which the lubricating oil is emptied into the interior of the can.

FIGURE 3 is a view looking into the top of the measuring device shown in FIGURE 2, and showing the fractional indicia.

Figures 4, 5, 6:
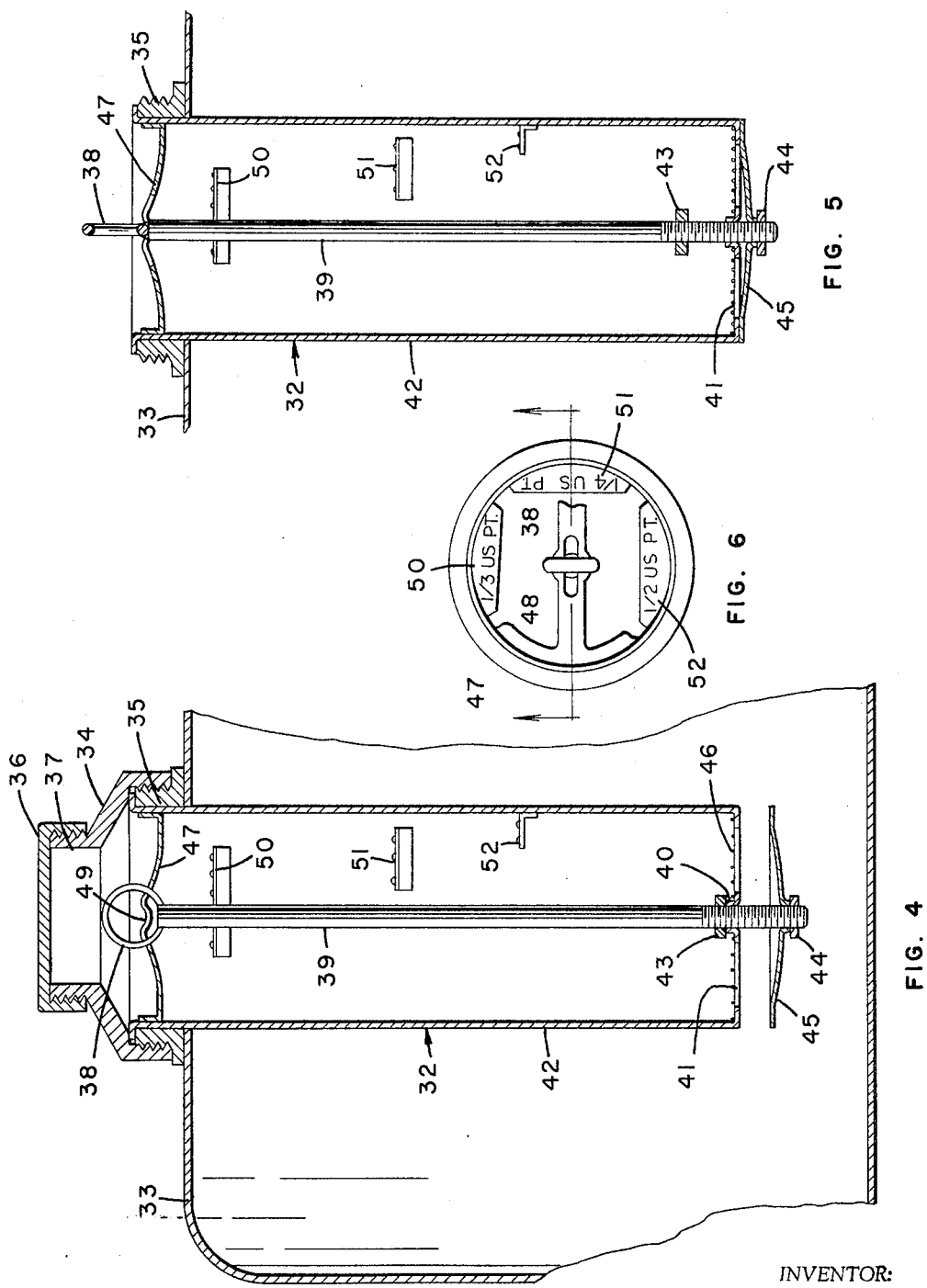
FIGURE 4 is a sectional elevation of a further modified form of the invention, in the open position to discharge the oil into the can.
FIGURE 5 illustrates the closed position of the device shown in FIGURE 4, preparatory to receiving a quantity of lubricating oil.
FIGURE 6 is a view looking into the top of the device in the condition shown in FIGURE 5.

Referring to FIGURE 1, the measuring device generally indicated at 10 is inserted in the opening in the standard gasoline can 11 which is normally covered by the cap 12. The measuring device includes a tubular member 13 with an outer peripheral flange 14 which is normally interposed between the top of the threaded collar 15 (surrounding the opening in the can) and the top 16 of the cap 12. The lower end of the tubular member 13 is substantially open, except for the minor obstruction provided by the transverse bars 17 which have a centrally-located bearing portion 18 slidably receiving the actuating rod 19. The valve plate 20 covers the open bottom of the tubular member 13 in the closed position shown in FIGURE 1, with the plate being retained on the rod 19 by the cotter pin 19a.

At the outer portion of the device, a generally cup-shaped member 21 is slidably mounted within the tubular member 13, with the bottom of the cup being perforate. The cup also provides a central portion 22 for engagement with the rod 19, and the transverse portion of the cup also engages the conical coil spring 23 which biases the cup and rod upwardly to the closed position of the valve 20. The bottom of the spring 21 rests against suitable shelves 24 either formed integrally with the walls of the tubular member 13, or affixed to it as extra members.

In the operation of the device, the cap 12 is first removed from the gasoline can 11. On the first usage of the unit, the device 10 is slipped into the opening formerly covered by the cap 12, until the flange 14 engages the top of the collar 15. The device is then positioned to perform its measuring function, and lubricating oil is poured into the device to the desired level—either to the bottom of the cup 21, or to the level corresponding to the fractional indicia 25 or 26. The surfaces presented by these indicia members (and also that of the bottom of the cup 21) are normally bright metal. The presence of lubricating oil above these surfaces will have a tendency to obscure them, and it will therefore be obvious when the level of oil has reached the desired point.

When the proper quantity of oil has been inserted, the cap 12 may be installed, resulting in a dumping of the lubricating oil into the interior of the can 11. The device remains open, permitting circulation of gasoline within the interior of the measuring device so that all of the lubricating oil is ultimately dissolved and intermixed, with none of the gasoline remaining entrapped in the device. The discharge of mixed gasoline and oil would normally be accomplished through another opening in the can.

As an alternative filling procedure, a pump nozzle 27 may be inserted directly in the cup 21 with downward pressure, so as to actuate the valve 20 into the open position. The outflow of gasoline through the nozzle 27 will serve to wash the interior of a device free of oil, after which the restoration of the cap 12 will maintain the open condition of the device.

It is also possible to incorporate a manually-operated locking device for selecting the valve position, as shown in FIGURE 2. The preferred form of this includes the L-shaped cutout 28 in the sidewall of the tubular member 29, and the radial projection 30 preferably formed integrally with the cup 21. When the projection 30 is in the axially-extending portion of the cutout 28, the spring 31 is free to force the device to the closed position of the valve. The device can be locked open, however, by the placement of the projection 30 in the position illustrated in FIGURE 2.

Referring to FIGURES 4, 5, and 6, a slightly modified measuring device generally indicated at 32 is shown installed in a gasoline can 33 equipped with a double cap 34 engaging the threaded collar 35 secured to the can. The outer cap 36 is in threaded engagement with the upper extension 37 of the cap, and can be removed separately to expose the control ring 38 for manipulating the valve mechanism without affecting the assembled relationship of the device 32 with respect to the can 33. The actuating rod 39 slidably engages the central bearing 40 in the perforate bottom 41 of the tubular member 42. The lower extremity of the rod 39 is threaded, and is engaged by the nut 43 and also by the nut 44. The valve plate 45 is retained in place by the nut 44, and the upper nut 43 can be used to function as a stop for controlling the open position of the device. If desired, a screen 46 may be placed above the perforate bottom 41.

The diametral beam 47 is secured to the opposite sides of the tubular member 42, and is provided with an elongated cutout 48 which will permit the ring 38 to slip downwardly to at least some degree. The beam has a central discontinuity as indicated at 49 for establishing the raised position of the actuating rod 39, corresponding to the closed position shown in FIGURE 5. Shifting from the FIGURE 4 to the FIGURE 5 positions is accomplished by grasping the ring 38 and pulling it upwardly sufficient to clear the central portion of the beam 47, and rotating the ring 38 about the axis of the rod 39 to either the FIGURE 4 or FIGURE 5 position. Release of the ring will then result in a natural tendency for the device to maintain the adjusted position. Preferably, this form of the device will also include the fractional indicia members 50–52.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. In combination with a fuel container having at least one opening and a threaded collar surrounding said opening and extending outwardly from said container, and also having a threaded cap normally engaging said collar to close said opening, said cap having an aperture and a secondary cap normally covering said aperture,
   a device for measuring additive to contents of said container, said device comprising:
   a tubular member normally extending into said container from said opening and fixed with respect to said container,
      said tubular member having a peripheral flange at the outer end thereof normally interposed between said cap and said collar,
      said tubular member also having shelf means on the interior thereof at an intermediate position along the length of said tubular member;
   valve means normally covering the inner end of said tubular member and operative to retain the contents of said tubular member or discharge the same into said container in the open and closed positions of said valve means;
   an actuating rod connected to said valve means and extending along said tubular member to the outer portion thereof;
   means for selectively altering the position of said rod to control said valve, including
      a cup having a perforate bottom and slidably mounted in said tubular member, said cup being secured to said actuating member,
      biasing means engaging said shelf means and urging said cup outward along said tubular member to close said valve,
      said cup member being adapted to extend axially outward beyond said tubular member and collar in the closed position of said valve, and further adapted to engage said cap on the application of said cap to said collar to displace said cup and thereby open said valve;
   interengageable locking means on said cup and tubular member to selectively fix the relative position thereof corresponding to the open and closed positions of said valve; and
   indicia means within said tubular member at various axial positions to register the depth of liquid in said tubular member.

2. In combination with a fuel container having at least one opening and a threaded collar surrounding said opening and extending outwardly from said container, and also having a threaded cap normally engaging said collar to close said opening,
   a device for measuring additive to contents of said container, said device comprising:
   a tubular member normally extending into said container from said opening and fixed with respect to said container,
      said tubular member having a peripheral flange at the outer end thereof normally interposed between said cap and said collar;
   valve means normally covering the inner end of said tubular member and operative to retain the contents of said tubular member or discharge the same into said container in the open and closed positions of said valve means;
   an actuating rod connected to said valve means and extending along said tubular member to the outer portion thereof;
   means for selectively altering the position of said rod to control said valve, including
      a cup having a perforate bottom and slidably mounted in said tubular member, said cup being secured to said actuating member,
      biasing means urging said cup outward along said tubular member to close said valve, and
   interengageable locking means on said cup and tubular member to selectively fix the relative position thereof corresponding to the open and closed positions of said valve.

3. In combination with a fuel container having at least one opening and a threaded collar surrounding said opening and extending outwardly from said container, and also having a threaded cap normally engaging said collar to close said opening, said cap having an aperture and a secondary cap normally covering said aperture,
   a device for measuring additive to contents of said container, said device comprising:
   a tubular member insertable in said opening, and normally extending into said container from said opening,
   said tubular member having a peripheral flange at the outer end thereof normally interposed between said cap and said collar to secure said tubular member with respect to said container;
   valve means normally covering the inner end of said tubular member and operative to retain the contents of said tubular member or discharge the same into said container in the open and closed positions of said valve means;
   an actuating rod connected to said valve means and extending along said tubular member to the outer portion thereof;
   means for selectively altering the position of said actuator member to control said valve, including a diametral beam having a central bearing slidably and rotatably receiving said actuating rod, and a transverse member secured to said rod outward from said beam, and engageable with said beam in at least two axial positions of said rod corresponding to open and closed positions of said valve means;

indicia means within said tubular member at various axial positions to register the depth of liquid in said tubular member.

4. In combination with a fuel container having at least one opening and a threaded collar surrounding said opening and extending outwardly from said container, and also having a threaded cap normally engaging said collar to close said opening, a device for measuring additive to contents of said container, said device comprising:

a tubular member insertable in said opening, and normally extending into said container from said opening, said tubular member having a peripheral flange at the outer end thereof normally interposed between said cap and said collar to secure said tubular member with respect to said container;

valve means normally covering the inner end of said tubular member and operative to retain the contents of said tubular member or discharge the same into said container in the open and closed positions of said valve means;

an actuating rod connected to said valve means and extending along said tubular member to the outer portion thereof; and means for selectively altering the position of said rod to control said valve, including a diametral beam secured to said tubular member and having a central bearing slidably and rotatably receiving said actuating rod, and a transverse member secured to said rod outward from said beam, and engageable with said beam in at least two axial positions of said rod corresponding to open and closed positions of said valve means.

5. In combination with a container having at least one opening and a threaded collar surrounding said opening and extending outwardly from said container, and also close said opening, a device for measuring additive to contents of said container, said device comprising:

a tubular member normally extending into said container from said opening and fixed with respect to said container, said tubular member having a peripheral flange at the outer end thereof normally interposed between said cap and said collar, said tubular member also having shelf means on the interior thereof at an intermediate position along the length of said tubular member;

valve means normally covering the inner end of said tubular member and operative to retain the contents of said tubular member or discharge the same into said container in the open and closed positions of said valve means;

an actuating rod connected to said valve means and extending along said tubular member to the outer portion thereof; and means for selectively altering the position of said rod to control said valve, including a cup having a perforate bottom and slidably mounted in said tubular member, said cup being secured to said actuating member, biasing means engaging said shelf means and urging said cup outward along said tubular member to close said valve, said cup member being adapted to extend axially outward beyond said tubular member and collar in the closed position of said valve, and further adapted to engage said cap on the application of said cap to said collar to displace said cup and thereby open said valve.

6. In combination with a container having at least one opening, and having a cap normally engaging said container to close said opening, a device for measuring additive to contents of said container, said device comprising:

a tubular member normally extending into said container from said opening and mixed with respect to said container;

valve means adjacent the inner end of said tubular member and operative to retain the contents of said tubular member or discharge the same into said container in the open and closed positions of said valve means;

an actuating member connected to said valve means and extending along said tubular member to the outer portion thereof; and means for selectively altering the position of said actuator member to control said valve, including a cup having a perforate bottom and slidably mounted in said tubular member, said cup being secured to said actuating member, biasing means urging said cup outward along said tubular member to close said valve, said cup member being adapted to extend axially outward beyond said tubular member in the closed position of said valve, and further adapted to engage said cap on the application of said cap to said container to displace said cup and thereby open said valve.

7. In combination with a container having at least one opening and a cap normally engaging said container to close said opening, a device for measuring additive to contents of said container, said device comprising:

an outwardly open tubular member insertable in said opening, and normally extending into said container from said opening and fixed with respect to said container;

valve means adjacent the inner end of said tubular member and operative to retain the contents of said tubular member or discharge the same into said container in the open and closed positions of said valve means said tubular member forming an otherwise liquid-retaining chamber;

an actuating member connected to said valve means and extending along said tubular member to the outer portion thereof; and means accessible at said opening for selectively alternating the position of said actuator member to control said valve.

References Cited by the Examiner
UNITED STATES PATENTS

| 1,961,321 | 6/1934 | Young | 141—18 |
| 2,405,442 | 8/1946 | Mayo | 137—264 X |

FOREIGN PATENTS 557,217   5/1958.   Canada.

LAVERNE D. GEIGER, *Primary Examiner.*

H. BELL, *Assistant Examiner.*